(12) United States Patent
Kim

(10) Patent No.: US 6,792,849 B1
(45) Date of Patent: Sep. 21, 2004

(54) HOUSEHOLD SOYBEAN MILK MAKER

(76) Inventor: Hong-bae Kim, 5-7, Hyunchen-dong, Dukyang-ku, Kpyang-city, Kyunggi-do (KR)

( * ) Notice: Subject to any disclaimer, the term of this patent is extended or adjusted under 35 U.S.C. 154(b) by 0 days.

(21) Appl. No.: 10/727,981

(22) Filed: Dec. 5, 2003

(30) Foreign Application Priority Data

May 27, 2003 (KR) .................................. 10-2003-0033638

(51) Int. Cl.[7] .............................. A23L 1/00; A23L 1/20; A47J 43/044; B01F 7/20; A23C 3/02
(52) U.S. Cl. .............................. 99/348; 99/281; 99/285; 99/286; 99/288; 99/337; 99/453; 99/456; 99/483; 99/510; 366/204; 366/146; 366/249; 366/251; 366/331
(58) Field of Search ........................... 99/275, 279–281, 99/283, 285, 286, 288, 290, 300, 323.3, 331, 337, 338, 341, 348, 452–455, 456–460, 468, 483, 485, 495, 509–513; 426/43–46, 50, 52, 61, 431, 656, 520, 598, 523; 210/346, 694, 511, 514, 780, 793; 366/279, 204, 144–146, 249–251, 96–98, 100–104, 314, 331

(56) References Cited

U.S. PATENT DOCUMENTS

| | | | | |
|---|---|---|---|---|
| 360,485 A | * | 4/1887 | Smith | ......................... 403/292 |
| 4,059,016 A | | 11/1977 | Kitzinger et al. | |
| 4,203,099 A | | 5/1980 | Edwards | |
| 4,205,237 A | | 5/1980 | Miller | |
| 5,013,158 A | * | 5/1991 | Tarlow | ....................... 366/251 |
| 5,201,263 A | * | 4/1993 | Teng | ............................ 99/335 |
| 5,446,444 A | | 8/1995 | Lease | |
| 5,487,359 A | | 1/1996 | Montreuil | |
| 5,516,208 A | * | 5/1996 | Givant | ....................... 366/251 |
| 5,600,997 A | | 2/1997 | Kemp et al. | |
| 5,699,239 A | | 12/1997 | Komori | |
| 5,852,965 A | * | 12/1998 | Kim | ............................ 99/281 |
| 5,936,356 A | | 8/1999 | Brault | |
| 5,980,099 A | * | 11/1999 | Soon | ......................... 366/204 |
| 6,232,883 B1 | | 5/2001 | Silva et al. | |
| 6,247,393 B1 | * | 6/2001 | Chang | ......................... 99/348 |
| 6,248,978 B1 | | 6/2001 | Okuda | |
| 6,345,572 B1 | * | 2/2002 | Kao | ............................ 99/337 |
| 6,653,941 B2 | * | 11/2003 | Kim | ......................... 340/620 |
| 6,688,214 B1 | * | 2/2004 | Kikuchi et al. | ............... 99/483 |
| 6,703,723 B2 | * | 3/2004 | Kim | ......................... 307/112 |

\* cited by examiner

Primary Examiner—Timothy F. Simone
(74) Attorney, Agent, or Firm—Shlesinger Arkwright & Garvey LLP

(57) ABSTRACT

A household soybean milk maker including a main body defining a space for receiving water, a cover element openably installed on an upper end of the main body, a drive motor disposed in the cover element to generate rotating force, a drive shaft for outputting rotating force of the drive motor, a blade connected to the drive shaft, a temperature sensor for detecting a temperature of the inside of the main body, and a sieve-like container which accommodates soybeans therein and is detachably attached to the cover element. A water vessel is coupled to a lower end of the main body. A steam generator is arranged in the water vessel to generate steam. Guide tubes are formed in the main body so that steam generated by the steam generator can be supplied through the guide tubes to soybean juice produced when the blade breaks the soybeans.

5 Claims, 2 Drawing Sheets

HOUSEHOLD SOYBEAN MILK MAKER

CROSS-REFERENCE TO RELATED APPLICATIONS

This application claims the priority of Korean patent application no. 10-2003-0033638, filed May 27, 2003, which is incorporated herein by reference.

This application relates to Applicant's application Ser. No. 10/131,460, filed Apr. 25, 2002, now U.S. Pat. No. 6,653,941 to Kim, issued Nov. 25, 2003.

This application relates to Applicant's application co-pending Ser. No. 10/131,192, filed Apr. 25, 2002.

BACKGROUND OF THE INVENTION

1. Field of the Invention

The present invention relates, in general, to a household soybean milk maker and, more particularly, to a household soybean milk maker wherein, in place of a conventional heater, a steam generator is employed to generate steam and supply the steam through guide tubes to soybean juice so that the soybean juice is heated without altering quality, which is otherwise caused in the conventional art due to the soybean liquid being in contact with the heater.

2. Description of the Prior Art

In a traditional method, soybean milk and tofu are produced as described below.

First, after soybeans are cleanly washed, they are soaked in water for several hours. Then, the soaked soybeans are crushed using a pair of millstones or a mixer, and the crushed soybeans are divided into soybean juice and residue using a fine cloth or a sieve.

Thereupon, the soybean juice is received and boiled in a container such as a caldron. At this time, since bubbles are produced to overflow out of the container, it is necessary to boil the soybean juice while carefully adjusting the fire to prevent an overflow of the bubbles. After sufficiently boiling the soybean juice, by putting into the boiled soybean juice additives such as sugar, salt and the like, drinkable soybean milk is made.

When it is necessary to produce tofu, the hot soybean milk is added with a coagulant such as calcium sulphate and the like, and then stirred. Thereafter, with the lapse of several minutes, coagulation of the soybean milk proceeds, and thereby silken tofu so called a softer bean curd is prepared. By transferring the silken tofu into a draining container and pressing the silken tofu from the upper side to drain a part of the water content, tofu, that is, pressed tofu is finally made.

However, the above-described traditional method for producing soybean milk and tofu suffers from defects in that, since individual processes are separately implemented, inconvenience is caused and an entire procedure is complicated and requires a great deal of time and energy, whereby inefficiency results in. Particularly, the process for soaking soybeans into water takes a lengthy period, and it is difficult to appropriately adjust an amount of soybeans to be soaked each time. Moreover, in the traditional method, a protein content conservation factor is relatively low, and sanitary aspects of the production procedure were questionable.

In consideration of these problems, in order to ensure that soybean milk, silken tofu, and pressed tofu can be simply and conveniently made at home, the present applicant have disclosed "Household tofu making apparatus" on Korean Patent Publication No. 1999-225772 dated Oct. 15, 1999, "Household tofu making apparatus" on Korean Patent Publication No. 2000-228659 dated Mar. 15, 2000, "Household tofu maker" on Korean Utility Model Registration No. 158856 dated Jul. 16, 1999, and "Household tofu making apparatus having securely fastened blade part" on Korean Utility Model Registration No. 250843 dated Oct. 5, 2001.

Hereafter, a construction of a conventional household soybean milk maker will be described with reference to the attached drawing.

FIG. 1 is a cross-sectional view illustrating a conventional household soybean milk maker. As shown in FIG. 1, the conventional household soybean milk maker comprises a main body 11 which defines a space for receiving water, a cover element 12 which is openably installed on an upper end of the main body 11, a drive motor 13 which is disposed in the cover element 12 to generate rotating force upon power application thereto, a drive shaft 14 for outputting rotating force of the drive motor 13, a blade 15 which is connected to a distal end of the drive shaft 14, a heater 16 which downwardly extends from the cover element 12 to radiate thermal energy upon power application thereto and thereby heat the inside of the main body 11, a temperature sensor 17 for detecting a temperature of the inside of the main body 11, and a sieve-like container 18 which accommodates soybeans therein and is detachably attached to the cover element 12.

Operations of the conventional household soybean milk maker constructed as mentioned above will be described below.

After a user places soybeans in the sieve-like container 18, the sieve-like container 18 is attached to a lower end of the cover element 12. With water filled in the inside space of the main body 11, the cover element 12 is assembled to the upper end of the main body 11 so that the sieve-like container 18 is inserted into the inside space of the main body 11.

Next, as the user turns on a power switch (not shown) and thereby power is supplied, a control section (not shown) actuates the heater 16 and the temperature sensor 17, so that the soybeans are heated to a first predetermined temperature. Then, as the drive motor 13 is operated, the blade 15 which is connected to the distal end of the drive shaft 14 breaks the soybeans accommodated in the sieve-like container 18.

While the blade 15 breaks the soybeans, vortex flow is induced in the water received in the main body 11 by the rotating motion of the blade 15. Due to this vortex flow, fine soybean particles which reside in the sieve-like container 18 are moved out of the sieve-like container 18. Therefore, the soybeans broken by the blade 15 are divided into soybean juice which resides out of the sieve-like container 18 and residue which resides in the sieve-like container 18.

Thereafter, the control section actuates again the heater 16 and the temperature sensor 17 to heat the soybean juice to a second predetermined temperature, by which soybean milk is prepared.

When it is necessary to produce tofu, the user takes out the hot soybean milk from the main body 11. Then, the hot soybean milk is added with a coagulant and then stirred, so that the soybean milk is coagulated. Thereupon, by transferring the resultant silken tofu into a draining container and pressing the silken tofu to drain a part of the water content, tofu, that is, pressed tofu is finally made.

Nevertheless, the conventional household soybean milk maker is not free from shortcomings in that, since the heater is employed to heat soybean juice, the soybean juice is likely to be overly heated to be changed in its quality.

SUMMARY OF THE INVENTION

Accordingly, the present invention has been made keeping in mind the above problems occurring in the prior art, and an object of the present invention is to provide a household soybean milk maker wherein, in place of a conventional heater, a steam generator is employed to generate steam and supply the steam through guide tubes to soybean juice so that the soybean juice is heated without altering quality, which is otherwise caused in the conventional art due to the soybean liquid being in contact with the heater.

In order to achieve the above object, according to the present invention, there is provided a household soybean milk maker including a main body which defines a space for receiving water, a cover element which is openably installed on an upper end of the main body, a drive motor which is disposed in the cover element to generate rotating force upon power application thereto, a drive shaft for outputting rotating force of the drive motor, a blade which is connected to a distal end of the drive shaft, a temperature sensor for detecting a temperature of the inside of the main body, and a sieve-like container which accommodates soybeans therein and is detachably attached to the cover element, wherein a water vessel is coupled to a lower end of the main body, a steam generator is arranged in the water vessel to generate steam upon power application thereto, and guide tubes are formed in the main body so that steam generated by the steam generator can be supplied through the guide tubes to soybean juice which is produced when the blade breaks the soybeans.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
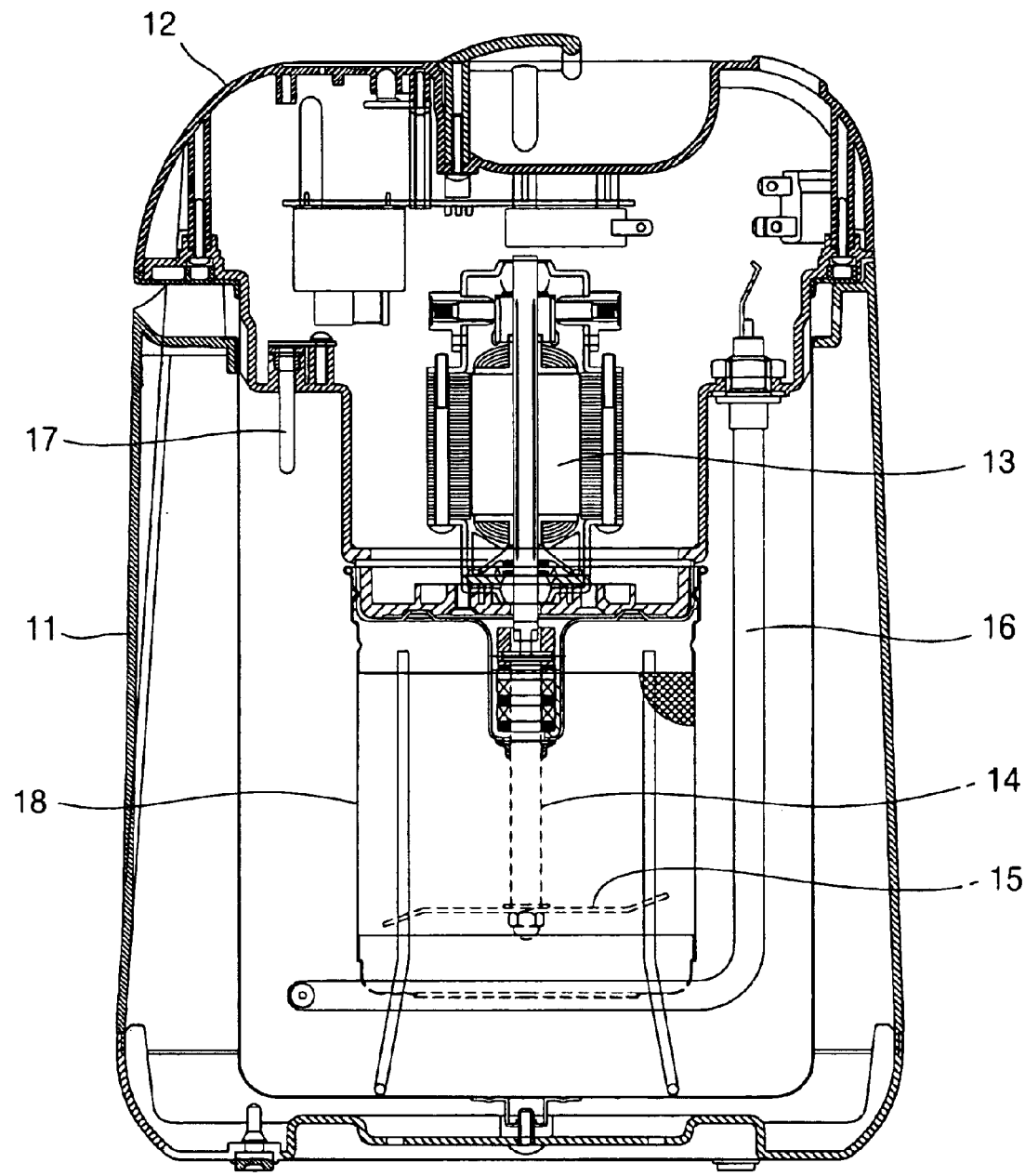
FIG. 1 is a cross-sectional view illustrating a conventional household soybean milk maker.
Figure 2:
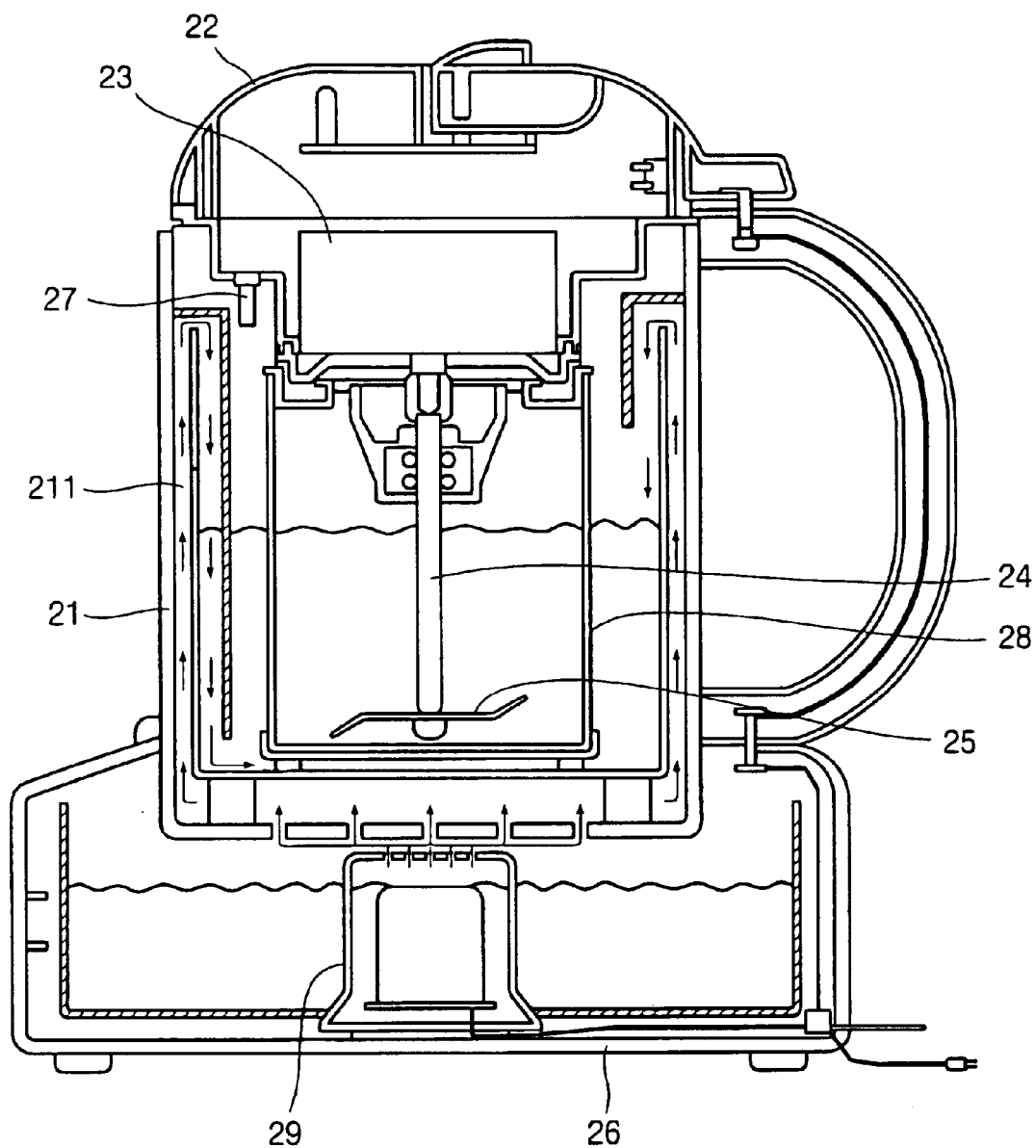
FIG. 2 is a cross-sectional view illustrating a household soybean milk maker in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

A household soybean milk maker in accordance with an embodiment of the present invention includes a main body 21 which defines a space for receiving water, a cover element 22 which is openably installed on an upper end of the main body 21, a drive motor 23 which is disposed in the cover element 22 to generate rotating force upon power application thereto, a drive shaft 24 for outputting rotating force of the drive motor 23, a blade 25 which is connected to a distal end of the drive shaft 24, a temperature sensor 27 for detecting a temperature of the inside of the main body 21, and a sieve-like container 28 which accommodates soybeans therein and is detachably attached to the cover element 22. According to the present invention, a water vessel 26 is coupled to a lower end of the main body 21, a steam generator 29 is arranged in the water vessel 26 to generate steam upon power application thereto, and guide tubes 211 are formed in the main body 21 so that steam generated by the steam generator 29 can be supplied through the guide tubes 211 to soybean juice which is produced when the blade 25 breaks the soybeans, to thereby heat the soybean juice at the top and bottom positions.

Hereafter, operations of the household soybean milk maker according to the present invention, constructed as mentioned above, will be described.

First, a user places soybeans in the sieve-like container 28 and pours water into the main body 21. Then, with the sieve-like container 28 attached to a lower end of the cover element 22 or placed in the main body 21, the cover element 22 is assembled to the upper end of the main body 21.

Next, as the user turns on a power switch (not shown) and thereby power is supplied, a control section (not shown) actuates the steam generator 29 which is arranged in the water vessel 26, so that steam generated by the steam generator 29 is supplied, through the guide tubes 211 formed in the main body 21 airtightly coupled with the water vessel 26, to the top and bottom of the main body 21 and thereby the soybeans are first heated.

At this time, the control section actuates the temperature sensor 27, so that the soybeans are heated to a first predetermined temperature. Then, as the drive motor 23 is operated, the blade 25 which is connected to the distal end of the drive shaft 24 breaks the soybeans accommodated in the sieve-like container 28.

While the blade 25 breaks the soybeans, vortex flow is induced in the water received in the main body 21 by the rotating motion of the blade 25. Due to this vortex flow, fine soybean particles which reside in the sieve-like container 28 are moved out of the sieve-like container 28. Therefore, the soybeans broken by the blade 25 are divided into soybean juice which resides out of the sieve-like container 28 and residue which resides in the sieve-like container 28.

Thereafter, when the breaking operation for the soybeans by the blade 25 is completed, the control section actuates again the steam generator 29, so that steam generated by the steam generator 29 is supplied, through the guide tubes 211 formed in the main body 21 airtightly coupled with the water vessel 26, to the top and bottom of the main body 21 and thereby the broken soybeans are second heated.

At this time, the control section actuates again the temperature sensor 27 to heat the soybean juice to a second predetermined temperature, by which soybean milk is prepared.

When it is necessary to produce tofu, the user takes out the hot soybean milk from the main body 21. Then, the hot soybean milk is added with a coagulant and then stirred, so that the soybean milk is coagulated. Thereupon, by transferring the resultant silken tofu into a draining container and pressing the silken tofu to drain a part of the water content, tofu, that is, pressed tofu is finally made.

As apparent from the above description, the household soybean milk maker according to the present invention provides advantages in that, since a steam generator is employed in place of a conventional heater to generate steam and supply the steam through guide tubes to soybean juice, the soybean juice can be heated without altering quality, which is otherwise caused in the conventional art due to the soybean liquid being in contact with the heater.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A household soybean milk maker including a main body which defines a space for receiving water, a cover element which is openably installed on an upper end of the main body, a drive motor which is disposed in the cover element to generate rotating force upon power application thereto, a drive shaft for outputting rotating force of the drive motor, a blade which is connected to a distal end of the drive shaft, a temperature sensor for detecting a temperature of the inside of the main body, and a sieve-like container which accommodates soybeans therein and is detachably attached to the cover element, wherein a water vessel is coupled to a lower end of the main body, a steam generator is arranged in the water vessel to generate steam upon power application thereto, and guide tubes are formed in the main body so that steam generated by the steam generator can be supplied through the guide tubes to soybean juice which is produced when the blade breaks the soybeans.

2. A soybean milk maker, comprising:
   a) a body including a space configured for receiving water;
   b) a cover provided at an upper and of the body;
   c) a drive motor provided adjacent the cover, the drive motor including a drive shaft for outputting a rotary force;
   d) a blade provided on an end of the drive shaft at a distance from the drive motor;
   e) a temperature sensor, the temperature sensor being configured for detecting a temperature on the inside of the body;
   f) a sieve-like container configured for receiving soybeans, the sieve-like container being detachably attached to the cover;
   g) a water vessel attached to the body;
   h) a steam generator provided in the water vessel, the steam generator being configured for generating steam; and
   i) a guide tube provided for supplying steam generated by the steam generator to a soybean juice in the soybean milk maker, in use, when a soybean juice has been produced by the blade driven by the drive shaft breaks the soybeans.

3. Soybean milk maker as in claim 2, wherein:
   a) the guide tube is formed in the body.

4. Soybean milk maker as in claim 3, wherein:
   a) the guide tube includes a plurality of guide tubes.

5. Soybean milk maker as in claim 2, wherein:
   a) the guide tube includes a plurality of guide tubes.

* * * * *